US011884399B2

(12) United States Patent
Gross (10) Patent No.: US 11,884,399 B2
(45) Date of Patent: Jan. 30, 2024

(54) STORAGE COMPARTMENT ARRANGEMENT FOR A CABIN OF A VEHICLE INCLUDING A PIVOTABLE INTERMEDIATE BASE

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 87 days.

(21) Appl. No.: 17/536,320

(22) Filed: Nov. 29, 2021

(65) Prior Publication Data

US 2022/0153419 A1 May 19, 2022

Related U.S. Application Data

(63) Continuation of application No. PCT/EP2021/051601, filed on Jan. 25, 2021.

(30) Foreign Application Priority Data

Jan. 31, 2020 (DE) .................. 10 2020 102 439.8

(51) Int. Cl.
*B64D 11/00* (2006.01)
(52) U.S. Cl.
CPC ................. *B64D 11/003* (2013.01)
(58) Field of Classification Search
CPC ................................................... B64D 11/003
See application file for complete search history.

(56) References Cited

U.S. PATENT DOCUMENTS 4,383,347 A 5/1983 La Conte
2008/0078871 A1 4/2008 Munson et al.
(Continued)

FOREIGN PATENT DOCUMENTS

DE 20 2004 009 067 U1 8/2004
DE 10 2004 043910 A1 3/2006
(Continued)

OTHER PUBLICATIONS

German Search Report for Application No. 102020102415 dated Jan. 18, 2021.
(Continued)

*Primary Examiner* — Brady W Frazier
*Assistant Examiner* — Shanna Danielle Glover
(74) *Attorney, Agent, or Firm* — KDW Firm PLLC (57) ABSTRACT

A storage compartment arrangement for a cabin of a vehicle has a storage compartment, housing, storage compartment opening, lower compartment, and upper compartment. The compartments are directly above each other and separated by an intermediate base pivotable at least in sections into the upper compartment. Items of luggage can be placed onto a lower horizontal pivoting edge and pushed into the lower compartment. Adjacent to a lower delimitation of the upper compartment, when the intermediate base is not pivoted, an upper horizontal pivoting edge is formed, onto which items of luggage can be placed and pushed into the upper compartment. The upper compartment has an upper opening edge adjoined by an auxiliary surface extending over the upper compartment, is at an angle in a range of 10° to 50° to the intermediate base and, as the distance from the upper delimitation increases, encloses an increasing distance from the intermediate base.

18 Claims, 5 Drawing Sheets

(56) References Cited

U.S. PATENT DOCUMENTS

| | | | |
|---|---|---|---|
| 2016/0059964 A1* | 3/2016 | Breuer | B64D 11/003 |
| | | | 160/350 |
| 2016/0288908 A1* | 10/2016 | Moje | B64D 11/003 |
| 2017/0283058 A1* | 10/2017 | Papke | E05D 5/04 |
| 2018/0215467 A1 | 8/2018 | Sankrithi et al. | |
| 2018/0362164 A1 | 12/2018 | Metten | |
| 2019/0023401 A1* | 1/2019 | Savian | B64D 11/0606 |
| 2019/0254422 A1 | 8/2019 | Beere | |
| 2020/0178686 A1* | 6/2020 | Hermann | A47B 31/00 |

FOREIGN PATENT DOCUMENTS

| | | |
|---|---|---|
| DE | 10 2013 021 108 A1 | 6/2015 |
| EP | 0614806 A1 | 9/1994 |
| WO | WO 2021/151827 A1 | 8/2021 |

OTHER PUBLICATIONS

German Search Report for Application No. 102020102439 dated Jan. 20, 2021.
International Search Report for Application No. PCT/EP2021/051596 dated Apr. 15, 2021.
International Search Report for Application No. PCT/EP2021/051601 dated Apr. 15, 2021.

* cited by examiner

STORAGE COMPARTMENT ARRANGEMENT FOR A CABIN OF A VEHICLE INCLUDING A PIVOTABLE INTERMEDIATE BASE

CROSS-REFERENCE TO RELATED APPLICATIONS

This application is a continuation of and claims priority to Application No. PCT/EP2021/051601 filed Jan. 25, 2021, which claims priority to German Patent Application No. DE 10 2020 102 439.8 filed Jan. 31, 2020, the entire disclosures of which are incorporated by reference herein.

TECHNICAL FIELD

The disclosure herein relates to a storage compartment arrangement for a cabin of a vehicle, and to a vehicle having a passenger cabin and having at least one such storage compartment arrangement.

BACKGROUND

Fitting out of passenger cabins of aircraft is conventionally selected so as to make particularly efficient use of the space and at the same time to provide a high level of comfort. The need for storage space for hand luggage can vary depending on the travel distance to be covered by the aircraft. However, there is a trend for increasing hand luggage, in particular for short haul journeys. For this purpose, overhead storage compartments are known which have an enlarged volume and an enlarged storage compartment opening such that more luggage can be introduced into individual storage compartments.

SUMMARY

The result of simply enlarging storage compartments may be that luggage is accommodated relatively arbitrarily in storage compartments and in particular larger items of hand luggage from a certain amount of filling no longer fit into the storage compartments and therefore have to be pushed under passenger seats or require the rearrangement of items of luggage in the storage compartment.

It is the object of the disclosure herein to propose an alternative storage compartment arrangement which has a greater storage capacity, in particular for larger items of hand luggage, is nevertheless easily accessible and can be used even in more compact cabins.

The object is achieved by a storage compartment arrangement disclosed herein. Advantageous embodiments and refinements are disclosed herein.

A storage compartment arrangement for a cabin of a vehicle is disclosed, having at least one storage compartment with a housing, a storage compartment opening, a lower compartment formed in the housing, and an upper compartment formed in the housing, wherein the lower compartment and the upper compartment are arranged one directly above the other and are separated from each other by an intermediate base, which is pivotable at least in sections into the upper compartment, wherein, at a lower delimitation of the lower compartment, a lower horizontal pivoting edge is formed, onto which items of luggage can be placed and can be pushed into the lower compartment, wherein, adjacent to a lower delimitation of the upper compartment, when the intermediate base is not pivoted, an upper horizontal pivoting edge is formed, onto which items of luggage can be placed and can be pushed into the upper compartment, and wherein the upper compartment has an upper opening edge which is adjoined by an auxiliary surface which extends over the upper compartment, is at an angle in a range of 10° to 50° with respect to the intermediate base and, as the distance from the upper delimitation increases, encloses an increasing distance from the intermediate base.

The at least one storage compartment has a housing which predetermines the outer form of the storage compartment. The lower compartment and the upper compartment are realized in the housing. They lie directly one above the other and are characterized by the features depicted further below. It is conceivable for at least the lower compartment to be designed to accommodate largely standardized or at least recommended items of luggage, for example in accordance with IATA recommendations. Other dimensions on the basis of increased dimensions of items of luggage are also conceivable.

When an intermediate base is not pivoted, the compartments each have a compartment opening which leads into the storage compartment opening. The compartment openings permit luggage to be moved into or out of the compartments. It is expedient to design the storage compartment opening to be closable such that, during the use of the vehicle, the luggage located in the storage compartment remains safely stored and does not inadvertently drop into the cabin. For convenient introduction or removal of items of luggage, the two compartments can preferably be opened completely. This can be undertaken by the storage compartment flap.

The lower horizontal pivoting edge could be designed as a delimitation edge of the lower compartment. An item of luggage, for example a carry-on suitcase trolley, can be placed onto the pivoting edge in order subsequently to be pushed over it so as to slide into the lower compartment. A user can consequently stand, for example, in an aisle in the cabin next to passenger seats, can lift up their item of luggage and place it onto the lower pivoting edge in order then by further pushing to push the item of luggage completely into the lower compartment. The lower pivoting edge here facilitates the handling since, even at the beginning of introducing the item of luggage, some of the weight is absorbed by the storage compartment and the user has to make less effort.

Similarly thereto, an upper pivoting edge is provided for the upper compartment. The upper pivoting edge is preferably located on the intermediate base between the two compartments. The intermediate base here should be understood as meaning a flat, preferably plane body which extends between the two compartments and brings about a division of the at least one storage compartment. In a non-pivoted state, the intermediate base can preferably be oriented parallel to a cabin floor, when the storage compartment arrangement is located in a cabin, or it could enclose an angle of up to 5° with respect thereto. This can also be applicable for a compartment base of the lower compartment. The upper pivoting edge can lie directly in a plane spanned by the intermediate base, but also somewhat above the plane, for example a few millimeters to up to 1 or 2 cm thereabove, in order to form a type of edge. The aim with the upper pivoting edge is to permit a user to support an item of luggage on the upper pivoting edge and, by pushing the item of luggage along the upper pivoting edge, to bring the item of luggage into the upper compartment. Items of luggage can be secured by the edge against sliding out. This is in particular of advantage if a compartment base or the intermediate base has a slight inclination. Furthermore, the rigidity of the housing of the storage compartment is thereby improved. Such an edge could also be formed on the compartment base of the lower compartment.

Pivoting capability can be achieved by a hinge which runs parallel to the upper pivoting edge and connects two portions of the intermediate base to each other. A hinge line formed by the hinge can be arranged centrally between the upper pivoting edge and an opposite rear delimitation of the intermediate base. However, it could also be arranged further in the direction of the rear delimitation such that a substantial part of the intermediate base is pivotable upward. The pivoting makes it easier to fill the lower compartment, and the dimensions of the lower compartment can be minimized since an increased amount of space for pivoting and tilting items of luggage is not necessary.

It is conceivable here that, during use of the vehicle, the compartments are preferably filled successively. It could be appropriate to first fill the lower compartment with items of luggage, with the intermediate base pivoted upward. If only a portion ending at the upper pivoting edge is pivotable upward instead of the entire intermediate base, a rear portion of the intermediate base always remains arranged rigidly in the storage compartment. A user can consequently push an item of luggage to be introduced into the lower compartment under the rigid portion of the intermediate base. A possible orientation of the item of luggage is therefore predetermined such that the lower compartment is expediently and efficiently filled with a plurality of items of luggage.

By this configuration, a particularly space-saving arrangement of storage compartments with at the same time a high luggage capacity can be realized, the storage compartments also being able to be integrated in means of transport having smaller fuselage dimensions. The cabin of the vehicle can consequently have higher capacities for accommodating hand luggage. However, a possibly higher access opening for items of luggage in the upper compartment may therefore be the result. A user would then have to possibly lift an item of luggage somewhat higher in order to bring it into the upper compartment. The upper pivoting edge can, however, act here as assistance over a substantial portion of the process of introducing the item of luggage and can reduce the effort required by the user.

In order to be able to push the item of luggage more simply and more specifically into the upper compartment, the above-mentioned auxiliary surface is provided. The latter is located above the upper compartment in the vertical direction and encloses the above-mentioned angle with the intermediate base. If the item of luggage protrudes a few centimeters into the upper compartment and rests on the upper pivoting edge, an upper surface of the item of luggage is located between the upper pivoting edge and the auxiliary surface in surface contact with the auxiliary surface. The center of gravity of the item of luggage here lies outside the upper compartment. The position of the center of gravity causes a torque to act on the item of luggage about the upper pivoting edge in the direction of the auxiliary surface such that, consequently, the upper surface of the item of luggage is pressed onto the auxiliary surface by the deadweight of the item of luggage. Consequently, the auxiliary surface assists the absorbing of the weight and acts at the same time as a guide of the upper surface for pushing the item of luggage into the upper compartment.

The guide can be optimized to such an extent that a distance between the upper pivoting edge and the auxiliary surface is adapted to preferred items of luggage, for example carry-on suitcase trolleys. The angle enclosed between the intermediate base and the auxiliary surface is furthermore preferably selected in such a manner that an average user placing the item of luggage on the upper pivoting edge subsequently holds the item of luggage at such an angle with respect to the cabin floor that the space enclosed between the upper pivoting edge and the auxiliary surface permits the item of luggage to be pushed in. The angle can be approximately 10° to 50°, preferably 10° to 30° and particularly preferably 15° to 25°. The precise selection of the angle can be dependent on the distance of the upper horizontal pivoting edge from the floor and/or from the aisle.

All in all, the storage compartment arrangement according to the disclosure herein permits a particularly advantageous combination of compartments lying one above another in a space-saving manner without restricting the sense of comfort in the cabin.

It is particularly preferred if the storage compartment opening is closable by a storage compartment flap. For the pivoting of the intermediate base, it is expedient to be able to open the entire storage compartment. The storage compartment flap could be arranged here pivotably above the upper compartment and could be opened by pivoting upward. A region of the upper storage compartment flap located on a flap hinge can be curved in order to realize a harmonious termination of the storage compartment in the ceiling region of the cabin. The storage compartment flap can be a single part.

In an advantageous embodiment, at least half, and preferably at least two thirds, of the depth of the intermediate base is pivotable. The space thereby provided for a user is thereby of a sufficient size in order to be able to comfortably introduce an item of luggage into the lower compartment. A remaining portion of the intermediate base is preferably arranged rigidly and can guide the item of luggage expediently into a final position.

The lower compartment and the upper compartment could end horizontally flush in the region of the storage compartment opening. The lack of a horizontal offset leads to the upper compartment having a smaller depth extent for accommodating items of luggage. As a result, it could be appropriate either to accommodate a smaller number of items of luggage in the upper compartment, but these being oriented differently, i.e. in particular longitudinally with respect to the direction of the aisle, than in the lower compartment, or to permit only smaller items of hand luggage. The storage compartment is located in particular in a region of a fuselage cross section that extends distinctively in the horizontal direction. This can be for example an upper part of the fuselage cross section that lies directly below the ceiling region (what is referred to as the crown area of a fuselage cross section).

It is advantageous if the intermediate base has a first pivotable segment and a second pivotable segment, wherein the first pivotable segment is arranged on the second pivotable segment, and wherein pivot axes of the two segments are parallel to each other. The first segment could have the upper pivoting edge and is pivotable independently. It could be appropriate to arrange the first segment in such a manner that it is pivotable by substantially 180° with respect to the second segment and can thereby be placed onto an upper side of the second segment. The second segment is pivotable independently thereof. If the first segment rests on the second segment, the assembly consisting of or comprising the two segments can be moved to an upper side of the upper compartment.

In a particularly advantageous embodiment, the lower compartment is designed to accommodate a plurality of items of hand luggage having IATA standard maximum dimensions next to one another. The items of hand luggage can have approximately dimensions of 55×40×20 cm. Taking into consideration wheels, handles and the like, dimensions of approximately 56×40×25 cm can be assumed, wherein the latter dimension could also be exceeded somewhat. Approximately surrounding dimensions of 610 mm×406 mm×254 mm or slightly deviating dimensions could be appropriate. In the configuration of the lower compartment on such a basis, 90% or more of the customary items of hand luggage can consequently be accommodated. By close adaptation to the dimensions, the lower compartment can bring a user intuitively to arrange items of luggage next to one another in the same orientation such that as large an amount of items of hand luggage as possible can be accommodated there.

The lower compartment preferably has a base which is at a distance of at most 35 cm and preferably at most 30 cm from the non-pivoted intermediate base. By delimitation of the height of the lower compartment, a user can push the item of hand luggage only in an orientation provided for this purpose. A rear delimitation of the intermediate base serves here as a delimitation such that, for example, pushing in of the item of luggage upright is prevented. A distance of up to 35 cm or preferably of up to 30 cm permits the pushing in of an item of hand luggage having a thickness of, for example, up to 25 or 26 cm and could even allow the depositing of a jacket or the like thereon.

It is advantageous if an auxiliary plane spanned by the auxiliary surface is at a distance in a range from 20 to 45 cm and preferably 25 to 35 cm from the upper pivoting edge. The distance of the auxiliary plane could then be adapted to an above-mentioned recommended thickness of an item of hand luggage and permits the item of hand luggage to easily be pushed into the upper compartment. At the same time, however, the above-explained assisting of the item of luggage by the auxiliary surface is also promoted.

An advantageous embodiment furthermore has a gas spring which is coupled pivotably to the housing and to the intermediate base in order to hold the intermediate base in a pivoted-up position. Before the filling of the lower compartment, a user or a flight attendant can swing up the intermediate base with one arm and the intermediate base can remain in this position. It is therefore prevented at the same time that the upper compartment is filled with items of luggage which do not fit therein.

Furthermore, the storage compartment flap can have a display unit. The display unit can have in particular an LED- or OLED-based display. The display unit is preferably arranged on a lower portion of the storage compartment flap, which portion is preferably flat. In addition to various information, the display unit can also show moving images from external cameras or advertising information. The display unit can extend over a large portion or all of the storage compartment flaps.

Particularly preferably, the storage compartment arrangement furthermore has at least one passenger service unit or a service duct on a lower side of the housing. The storage compartment arrangement is therefore suitable for arranging directly above passenger seats. A service duct could accommodate a plurality of passenger service units and could accommodate same, for example, to be displaceable or fastenable at least to an adjustable position. The passenger service units then provide in particular the customary functions, such as reading light, air vent, and the provision of a display unit and of oxygen masks.

It is advantageous if the passenger service unit or the service duct merges steplessly and with a continuous curvature into a form of the housing. Therefore, not only can the visual form be configured attractively, but also possible impact edges can be prevented. If the lower end of the storage compartment arrangement is placed somewhat lower than in the case of conventional, smaller storage compartments, this is particularly advantageous.

The disclosure herein furthermore relates to a vehicle having a cabin, a floor, passenger seats located on the floor, and at least one storage compartment arrangement according to the preceding statements arranged above the passenger seats. This can be a cabin with a central aisle which separates from each other two passenger seat sections each having three passenger seats located next to one another. As an alternative thereto, the cabin can also have two aisles which are spaced apart from each other and run parallel to each other and separate three passenger seat sections from one another. These could then in particular have two lateral, outer passenger seat sections and a central passenger seat section. A storage compartment arrangement could be provided above an outer and/or above a central passenger seat section.

It is preferred if the lower horizontal pivoting edge is at a vertical distance in a range of 150-170 cm from the floor. Therefore, for example, passenger cabins can be fitted with the storage compartment arrangement according to the disclosure herein which, in a vehicle, in particular in aircraft, has a fuselage diameter of at most 6 m, preferably of at most 5 m and particularly preferably of at most 4 m. The vertical distance permits the easy introduction of items of luggage into the lower compartment and does not restrict the sense of comfort of passengers directly below the storage compartment arrangement.

It can also be advantageous if the upper horizontal pivoting edge is at a vertical distance in a range of 175-195 cm. Items of luggage can thereby also be introduced relatively simply into the upper compartment.

Finally, the auxiliary surface can enclose an angle in a range of 15° to 25° with respect to the intermediate base. In particular at the above-mentioned vertical distances, the auxiliary surface could support the item of luggage for the upper compartment.

BRIEF DESCRIPTION OF THE DRAWINGS

Further features, advantages and possible uses of the disclosure herein emerge from the following description of the example embodiments and from the figures. Here, all of the features described and/or illustrated in the figures form the subject matter of the disclosure herein individually and in any desired combination, even independently of the combination of the features in the individual claims or the back-references thereof. Furthermore, in the figures, the same reference signs are used for identical or similar objects.

DETAILED DESCRIPTION

Figure 1:
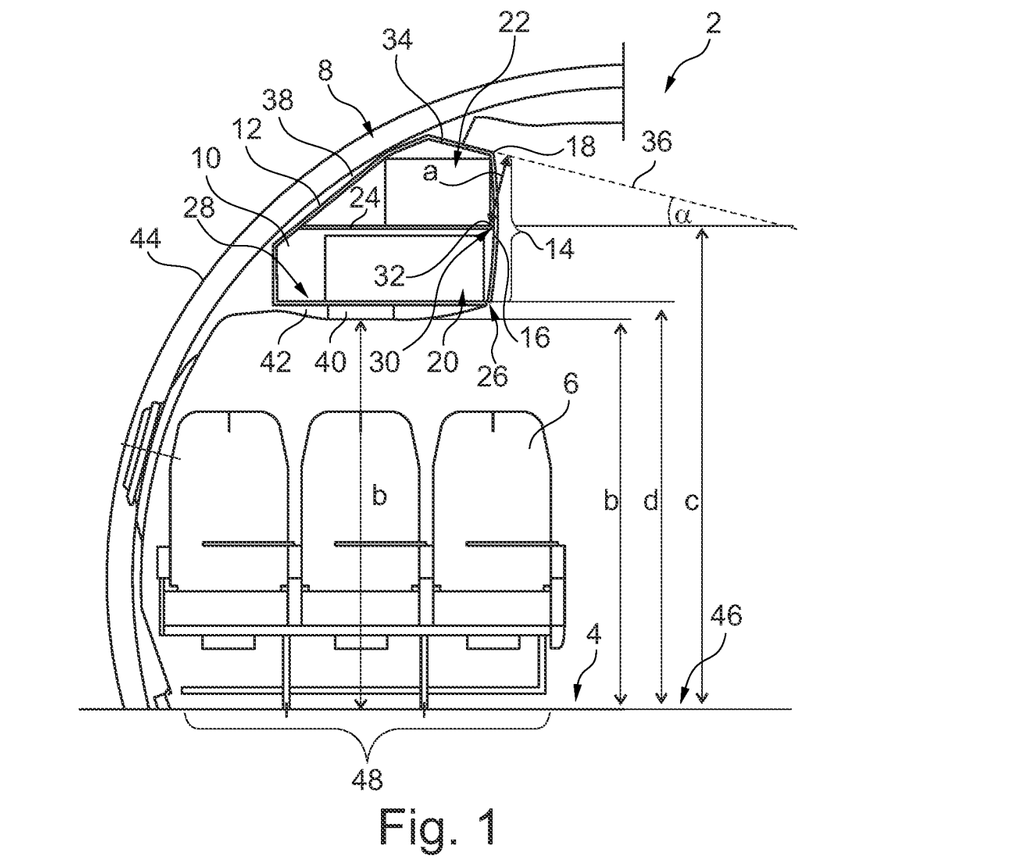
FIG. 1 shows a cabin with a storage compartment arrangement above passenger seats in a partial cross-sectional view.

FIG. 1 shows a passenger cabin 2 of a commercial aircraft with a floor 4, passenger seats 6 located thereon and a storage compartment arrangement 8 positioned thereabove. The storage compartment arrangement 8 has at least one storage compartment 10 which has a housing 12. The housing could extend, for example, over the length of four former sections of the aircraft. This could correspond, for example, to three rows of seats with a relatively narrow seat spacing. The housing 12 could completely surround the storage compartment 10 or could at least be open at least rearward. The storage compartment 10 has a storage compartment opening 14 which is closable by a storage compartment flap 16. Furthermore, a lower compartment 20 and an upper compartment 22 are formed in the storage compartment 10. The two compartments 20 and 22 lie directly one above the other and are separated from each other by an intermediate base 24. In this illustration, the intermediate base runs in particular parallel to the floor 4, and therefore the upper delimitation of the lower compartment 20 and the lower delimitation of the upper compartment 20 run parallel to the floor 4. The storage compartment opening 14 extends over the entire overall height of the two compartments 20 and 22 together such that items of luggage can be introduced freely into the compartments 20 and 22.

To assist the insertion of an item of luggage into the lower compartment 20, a lower horizontal pivoting edge 26 is provided. The latter terminates by way of example with a lower front edge of the lower compartment 20. A user can place an item of luggage onto the lower pivoting edge 26 in order then to push the item of luggage along the lower pivoting edge 26 into the lower compartment 20. The item of luggage is always supported by the lower pivoting edge 26 over the pushing distance. In this illustration, the intermediate base 24 forces a spatial orientation of the item of luggage to be followed and, by the limited height of the lower compartment 20, can support an item of luggage which has only been partially pushed in.

The lower compartment 20 has a compartment base 28 on which the item of luggage rests after being pushed in. The lower compartment 20 is dimensioned by way of example in such a manner that a row of items of luggage having dimensions according to IATA recommendations can be accommodated. These have, for example, a length of approximately 55 cm, a width of approximately 40 cm and a thickness of approximately 20-25 cm. In the example shown, the item of luggage can be pushed in flat and in the longitudinal direction, i.e. with a base of a lying item of luggage first. The depth of the lower compartment 20, which can be seen in the plane of the drawing of FIG. 1, is therefore somewhat more than 55 cm on an upper side of the lower compartment 20. This is measured at a height of for example 5 cm more than the thickness of the item of luggage, i.e. approximately 25-30 cm above the compartment base 28.

However, the upper compartment 22 has for example a significantly smaller depth at a height of 25-30 cm above the horizontal intermediate base 24. This could be approximately only somewhat more than 40 cm, and therefore an item of hand luggage having recommended dimensions can still be introduced, but in an orientation rotated by 90° and parallel to the longitudinal extent of the cabin. The number of items of luggage which can be accommodated by the upper compartment 22 is therefore reduced in comparison to the lower compartment 20. In order to simplify pushing in, an upper horizontal pivoting edge 30 is provided which is arranged on a front edge 32 of the intermediate base 24 that projects into the cabin, or is designed as the front edge. A user can place an item of luggage onto the upper horizontal pivoting edge 30 and can push it along the upper horizontal pivoting edge 30 into the upper compartment 22.

A particular feature resides in an auxiliary surface 34 which extends over the upper compartment 22 from an upper opening edge 18 and encloses an angle α in a range of 10° to 50° with respect to the horizontally arranged intermediate base 24. The auxiliary surface 34 furthermore, as the horizontal distance from the upper delimitation of the upper compartment 22 into the storage compartment interior increases, encloses an increasing distance from the intermediate base 24. The distance a of the auxiliary surface 34 from the upper pivoting edge 30, as measured vertically with respect to an auxiliary plane 36 in the region of an upper edge 18 of the storage compartment opening 14, could substantially correspond to the height of the lower compartment 20. An item of luggage which is inserted by a user between the upper horizontal pivoting edge 30 and the auxiliary surface 34 into the upper compartment 22 consequently rests on the upper pivoting edge 30, with the upper side of the item of luggage being pressed against the auxiliary surface 34 due to gravity. The arrangement consequently assists the user in using the hands to firmly hold the item of luggage, and therefore the handling is significantly simplified.

A rear wall 38 is connected rearwardly, running from the auxiliary surface 34 past the intermediate base 24 to a laterally outer end of the compartment base 28. Connected below the compartment base 28 is a passenger service unit 40 which is surrounded by a paneling 42 which has a continuous curvature.

By way of example, the cabin 2 is formed in an aircraft fuselage 44 which has a diameter of approximately 4 m. The floor 4 lies somewhat below a center point of the fuselage cross section. For example, the clear distance b between the PSU 40 and the floor 4 can be approximately 150 cm. The lower pivoting edge 26 could be located at a distance d of 150 to 170 cm above the floor 4 and approximately 155 cm in the example shown. The upper pivoting edge 30 could be arranged at a distance c of approximately 185 cm above the floor 4.

Because of the significant curvature of the fuselage 44 on the rear side of the storage compartment 10, the depth of the upper compartment 22 is different when edges 26, 30 and 18 are arranged horizontally flush. Nevertheless, larger items of luggage can be accommodated in different orientations.

It should be pointed out at this juncture that the cabin 2 has a central aisle 46 which is adjoined on both sides by respective passenger seat sections 48 which are fitted with rows of seats of up to three passenger seats 6 in each case. On both sides of the central aisle 46, storage compartments 10 arranged in a row next to one another in the longitudinal direction of the cabin can be located above the passenger seats 6 in each case. In this example, the space above the central aisle 46 remains free. As will be explained further below, the intermediate base 24 is designed to be foldable or pivotable.

If the storage compartment 10 extends, for example, over three former sections, it can accommodate five items of luggage 50 having the above-mentioned dimensions and oriented transversely with respect to the aisle 46 in the lower compartment, and three items of luggage 50 oriented longitudinally with respect to the aisle 46 in the upper compartment 22, such that the storage compartment 10 has an accommodating capacity for eight such items of luggage.

Figure 2A:
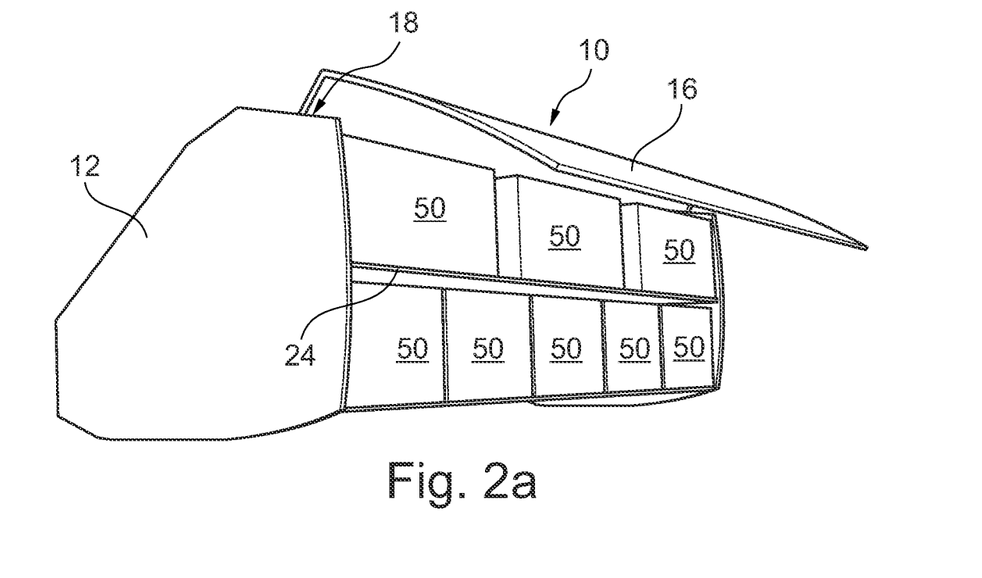
FIGS. 2a and 2b show a three-dimensional view of an open storage compartment.

FIG. 2a shows the design from a somewhat changed perspective, with the storage compartment flap 16 being open. It can be seen here that items of luggage 50 are arranged in the compartments 20 and 22, with the items of luggage 50 that are located in the upper compartment 22 resting on the horizontal intermediate base 24 and protruding as far as the upper pivoting edge 30 and being arranged parallel to the aisle 46. The items of luggage 50 in the lower compartment 20 in the meanwhile lie transversely with respect to the central aisle 46.

The storage compartment flap 16 can have a fitting, not shown specifically here, with which it is lockable in the closed state.

Figure 2B:
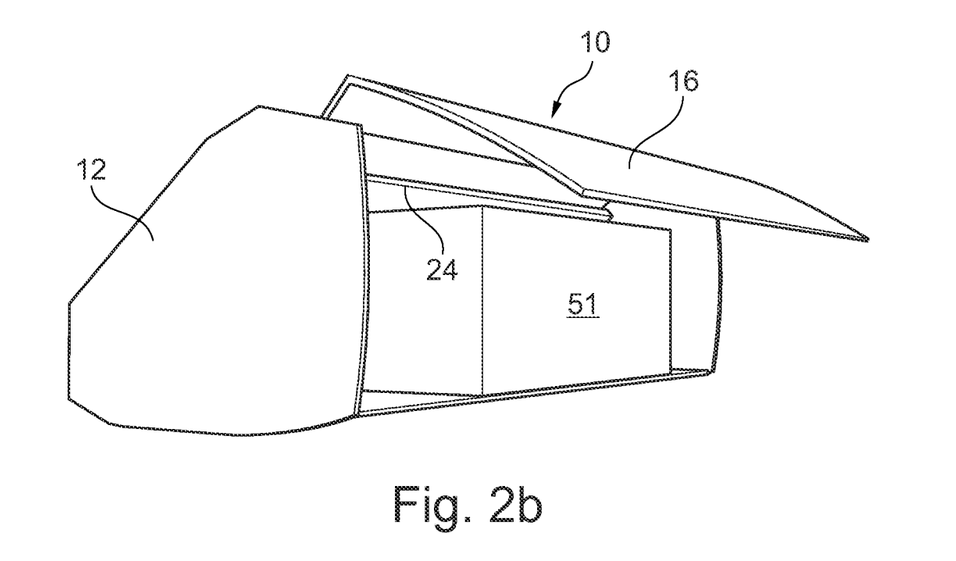

FIG. 2b shows the storage compartment 10 in a different state. Here, the intermediate base 24 has been pivoted upward and allows a significantly larger item of luggage 51 to be introduced into the enlarged compartment. The design of the intermediate base 24 is shown further below.

Figure 3A:
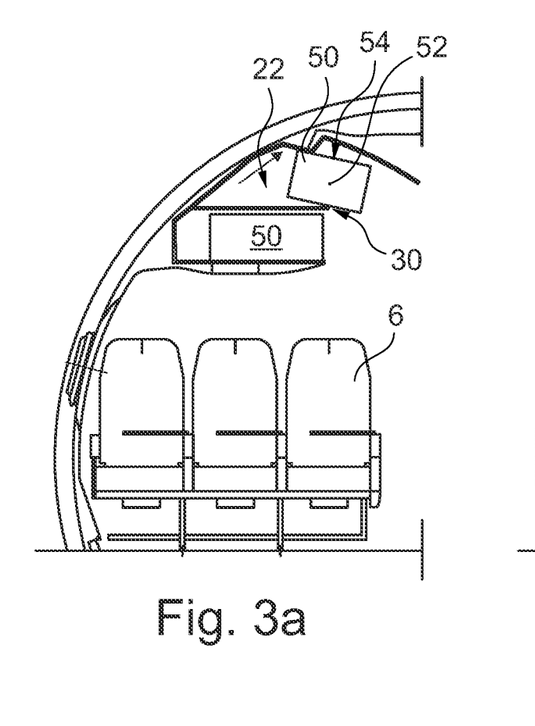
FIGS. 3a, 3b, 4, 5 and 6 show the sequence of introducing items of luggage.
Figure 3B:
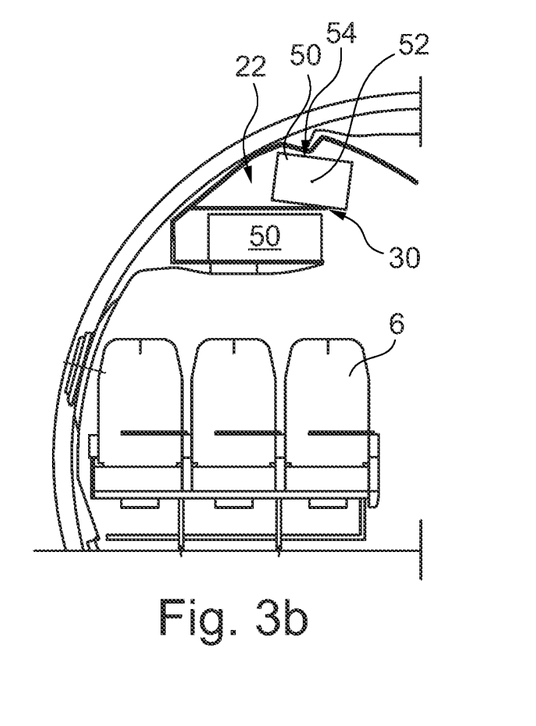

FIGS. 3a and 3b show the process of inserting an item of luggage 50 into the upper compartment 22. For this purpose, the center of gravity 52 of the item of luggage 50 is illustrated. In FIG. 3a, the center of gravity 52 is located in the horizontal direction outside the horizontal intermediate base 24 such that the item of luggage 50 which is arranged parallel to the aisle 46 experiences a torque about the upper pivoting edge 30 because of gravity. By this, an upper side 54 of the item of luggage 50 is pressed against the auxiliary surface 34. The item of luggage 50 is thereby held and guided between the upper pivoting edge 30 and the auxiliary surface 34. By further pushing the item of luggage 50 in the direction of the upper storage compartment 22, the center of gravity 52 passes over the upper pivoting edge 30 and further into the upper compartment 22 such that the item of luggage 50 carries out a pivoting movement in the direction of the intermediate base 24. By further pushing, the item of luggage 50 moves sliding on the intermediate base 24 in the direction of the rear wall 38.

Figure 4:
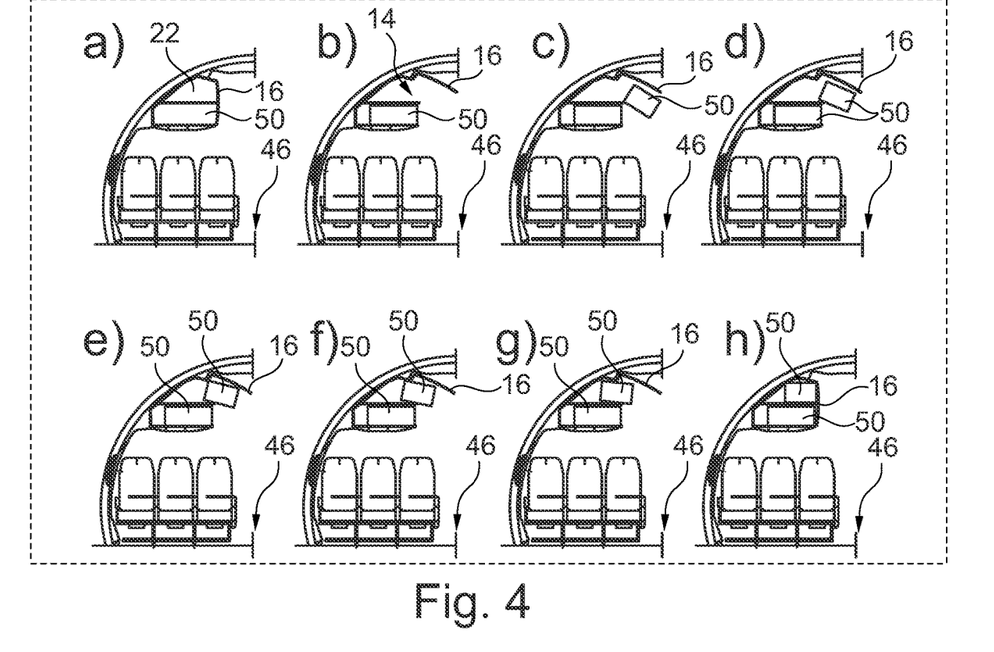

FIG. 4 shows the process of pushing the item of luggage 50 into the upper compartment 22 in somewhat more detail in a plurality of partial illustrations a), b), c), d), e), f), g) and h). In a), the upper compartment 22 is empty and closed. In b), the storage compartment flap 16 has been pivoted up. In c), the item of luggage 50 has been placed onto the upper pivoting edge 30 in an orientation parallel to the aisle 46. In d), the item of luggage 50 is pushed in the direction of the auxiliary surface 34 which it reaches in e). As can be seen in f), the item of luggage 50 is guided along the auxiliary surface 34 until, in g), the orientation shown in FIG. 3b is reached. After the item of luggage 50 has been pushed in, the storage compartment flap 16 is closed, as illustrated in h).

Figure 5:
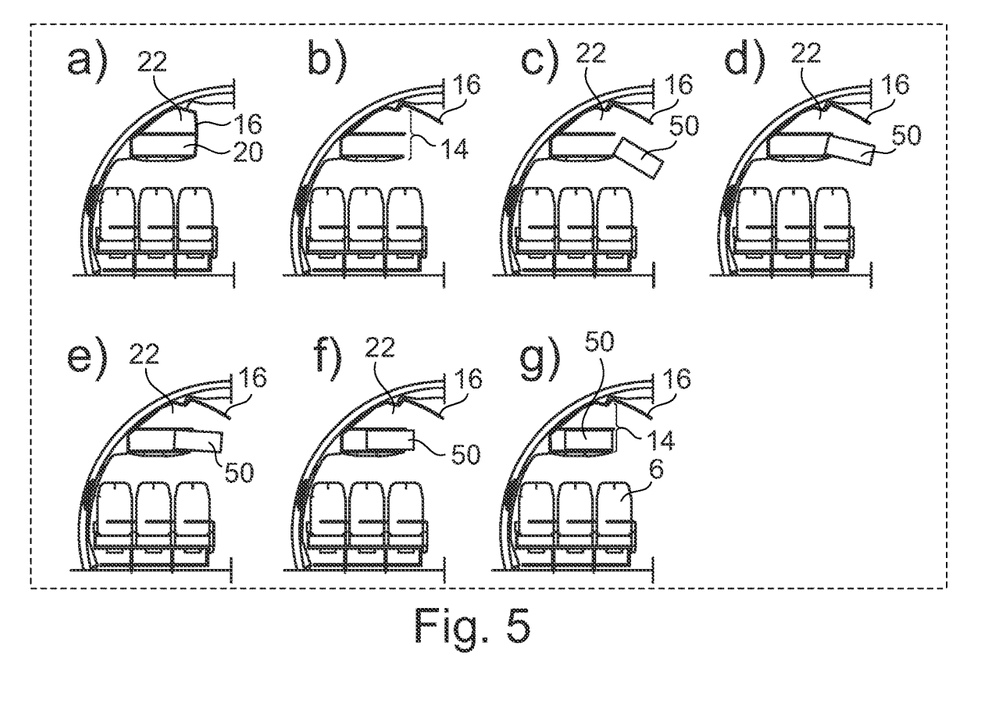

FIG. 5 shows the pushing of an item of luggage 50 into the lower compartment 20 in seven partial illustrations a), b), c), d), e), f) and g). In a), the storage compartment flap 16 is closed and in b) is open. At c), the item of luggage 50 has been placed onto the lower pivoting edge 26. In d), the item of luggage 50 already protrudes somewhat into the lower compartment 20 and is held and guided because of the limited height between the base 28 and the intermediate base 24. In f) and g), the item of luggage 50 is pushed further, until, in g), it is pushed in completely.

Figure 6:
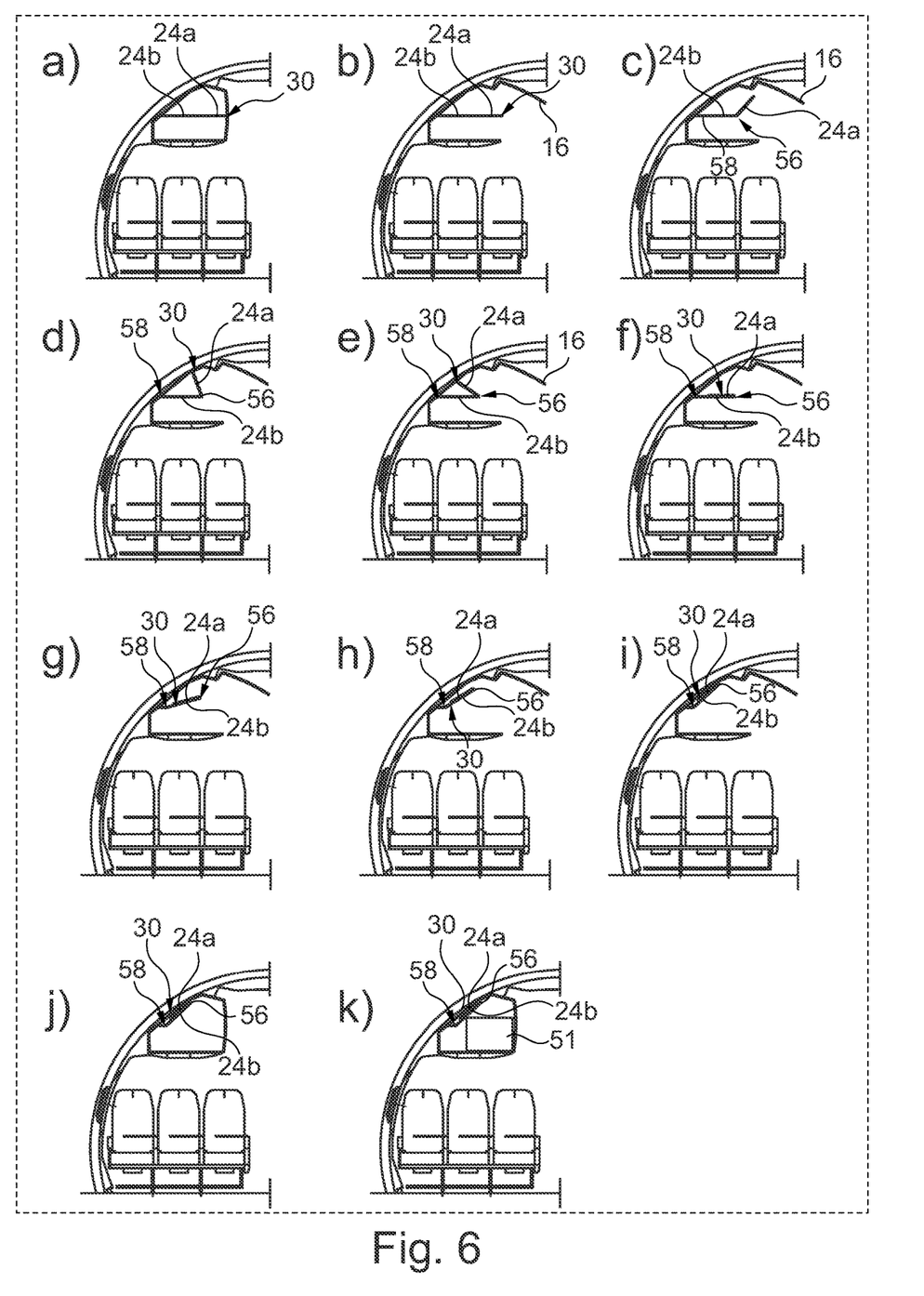

FIG. 6 shows, in eleven partial illustrations a) to k), the enlargement of the storage compartment 10 for the pushing in of the larger item of luggage 51, as indicated in FIG. 2b. The intermediate base 24 has a first segment 24a on which the upper pivoting edge 30 is arranged and which lies against the storage compartment opening 14. The first segment 24a is arranged pivotably on a second segment 24b via a first hinge 56. The first segment 24a can be folded onto the second segment 24b. The second segment 24b can in the meanwhile be pivoted upward about a second hinge 58. The second hinge 58 runs parallel to the first hinge 56. The two hinges 56 and 58 run parallel to the upper pivoting edge 30. By folding of the first segment 24a onto the second segment 24b and pivoting of the second segment 24b upward, the intermediate base 24 completely releases the partition between the two compartments 20 and 22. As a result, a relatively large item of luggage 51 can be pushed into the storage compartment 10, as shown in k).

Figure 7:
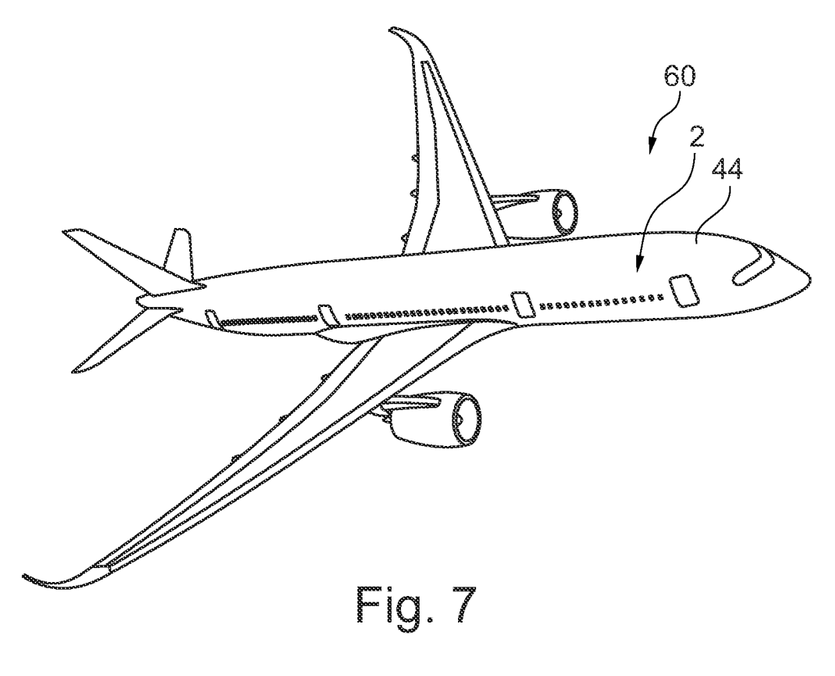
FIG. 7 shows an aircraft.

Finally, FIG. 7 shows an aircraft 60 which has the fuselage 44 in which the cabin 2 is arranged. The latter can have a storage compartment arrangement from the preceding figures.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority. Reference signs in the claims are not to be regarded as limiting.

REFERENCE SIGNS

2 Passenger cabin
4 Floor
6 Passenger seat
8 Storage compartment arrangement
10 Storage compartment
12 Housing
14 Storage compartment opening
16 Storage compartment flap
18 Upper opening edge
20 Lower compartment
22 Upper compartment
24 Intermediate base
24a First segment
24b Second segment
26 Lower horizontal pivoting edge
28 Compartment base
30 Upper horizontal pivoting edge
32 Front edge
34 Auxiliary surface
36 Auxiliary plane
38 Rear wall
40 Passenger service unit
42 Paneling
44 Aircraft fuselage
46 Central aisle
48 Passenger seat section
50 Item of luggage
51 Item of luggage
52 Center of gravity
54 Upper side of the item of luggage
56 Hinge
58 Hinge
60 Aircraft

The invention claimed is:

1. A storage compartment arrangement for a cabin of a vehicle, the storage compartment arrangement comprising:
   a housing;
   a storage compartment opening defined on a lateral edge of the housing;

a lower compartment defined in the housing;

an upper compartment defined in the housing, the upper compartment being arranged directly above the lower compartment; and an intermediate base that is attached to a rear wall of the housing, separates the lower compartment from the upper compartment, and is configured to pivot, at least in segments, into the upper compartment;

wherein the intermediate base has a fixed segment, a first pivotable segment, and a second pivotable segment, wherein the first pivotable segment is pivotably attached to the second pivotable segment at a first pivot axis, wherein the second pivotable segment is pivotably attached to the fixed segment at a second pivot axis, and wherein the first pivot axis is parallel to the second pivot axis;

wherein the housing comprises an auxiliary surface that extends over and defines at least a portion of an upper boundary of the upper compartment, wherein:
the auxiliary surface is arranged at an angle in a range of 10° to 50° with respect to the intermediate base; and
a vertical distance between the auxiliary surface and the intermediate base is a function of distance to the storage compartment opening, such that the vertical distance between the auxiliary surface and the intermediate base is smallest at an upper opening edge, which defines an upper bound of the storage compartment opening, and is greatest where the auxiliary surface is attached to the rear wall of the housing;

wherein the housing comprises a lower horizontal pivoting edge defined at a lower delimitation of the lower compartment, the lower horizontal pivoting edge being configured as an edge onto which items of luggage can be placed and can be pushed into the lower compartment; and wherein the intermediate base defines, when no segments of the intermediate base are pivoted into the upper compartment, an upper horizontal pivoting edge, the upper horizontal pivoting edge being configured as an edge onto which items of luggage can be placed and can be pushed into the upper compartment.

2. The storage compartment arrangement of claim 1, comprising a storage compartment flap that is pivotably attached to the housing at the auxiliary surface and is configured for closing the storage compartment opening.

3. The storage compartment arrangement of claim 1, wherein at least half of a depth of the intermediate base is pivotable within the housing.

4. The storage compartment arrangement of claim 1, wherein the lower compartment and the upper compartment end horizontally flush in a region of the storage compartment opening.

5. The storage compartment arrangement of claim 4, wherein the intermediate base has a fixed segment, a first pivotable segment, and a second pivotable segment, wherein the first pivotable segment is pivotably attached to the second pivotable segment at a first pivot axis, wherein the second pivotable segment is pivotably attached to the fixed segment at a second pivot axis, and wherein the first pivot axis is parallel to the second pivot axis.

6. The storage compartment arrangement of claim 1, wherein the lower compartment is configured to accommodate a plurality of items of hand luggage having IATA standard maximum dimensions next to one another.

7. The storage compartment arrangement of claim 1, wherein the housing comprises a compartment base, which is at a vertical distance of at most 35 cm from the intermediate base when the intermediate base is not pivoted into the upper compartment.

8. The storage compartment arrangement of claim 1, wherein an auxiliary plane spanned by the auxiliary surface is at a distance in a range from 20 to 45 cm from the upper horizontal pivoting edge.

9. The storage compartment arrangement of claim 1, comprising a gas spring which is coupled pivotably to the housing and to the intermediate base to hold the intermediate base in a pivoted-up position.

10. The storage compartment arrangement of claim 1, comprising at least one passenger service unit or a service duct on a lower side of the housing.

11. The storage compartment arrangement of claim 10, wherein the passenger service unit or the service duct merges steplessly and with a continuous curvature into a form of the housing.

12. A vehicle comprising:
a cabin;
a floor;
passenger seats located on the floor; and
at least one storage compartment arrangement of claim 1 above the passenger seats.

13. The vehicle of claim 12, wherein the lower horizontal pivoting edge is at a vertical distance in a range of 150-170 cm from the floor.

14. The vehicle of claim 12, wherein the upper horizontal pivoting edge is at a vertical distance in a range of 175-195 cm from the floor.

15. The vehicle of claim 12, wherein the auxiliary surface encloses an angle in a range of 30° to 35° with respect to the intermediate base.

16. The storage compartment arrangement of claim 1, wherein at least two-thirds of a depth of the intermediate base is pivotable within the housing.

17. The storage compartment arrangement of claim 1, wherein the housing comprises a compartment base which is at a vertical distance of at most 30 cm from the intermediate base when the intermediate base is not pivoted into the upper compartment.

18. The storage compartment arrangement of claim 1, wherein:
the first pivotable segment pivots, relative to the second pivotable segment about the first pivot axis, in a first pivoting direction;
the second pivotable segment pivots, relative to the fixed segment about the second pivot axis, in a second pivoting direction; and
the first pivoting direction and the second pivoting direction are a same pivoting direction.

* * * * *